United States Patent
Arora et al.

(10) Patent No.: US 12,363,025 B2
(45) Date of Patent: Jul. 15, 2025

(54) DISTINGUISHING INTERNAL AND EXTERNAL NETWORK DELAYS VIA MULTI-DOMAIN NAME SYSTEM (DNS) SERVER LATENCY PROBING

(71) Applicants: DISH Wireless L.L.C., Englewood, CO (US); DISH Network Technologies India Private Limited, Bangalore (IN)

(72) Inventors: Ankesh Arora, Rajasthan (IN); Mohammad Dawood Shahdad, Aurora, CO (US); Kevin Joseph Plunkett, Aurora, CO (US)

(73) Assignees: DISH Wireless L.L.C., Englewood, CO (US); DISH Network Technologies India Private Limited, Bangalore (IN)

( * ) Notice: Subject to any disclaimer, the term of this patent is extended or adjusted under 35 U.S.C. 154(b) by 52 days.

(21) Appl. No.: 18/461,256

(22) Filed: Sep. 5, 2023

(65) Prior Publication Data

US 2025/0080453 A1  Mar. 6, 2025

(51) Int. Cl.
*H04L 45/121* (2022.01)
*H04L 43/0864* (2022.01)
*H04L 43/0882* (2022.01)
*H04L 43/16* (2022.01)
*H04L 45/00* (2022.01)

(52) U.S. Cl.
CPC ........ *H04L 45/121* (2013.01); *H04L 43/0864* (2013.01); *H04L 43/0882* (2013.01); *H04L 43/16* (2013.01); *H04L 45/70* (2013.01)

(58) Field of Classification Search
CPC .............. H04L 45/121; H04L 43/0864; H04L 43/0882; H04L 43/16; H04L 45/70; H04L 43/0852; H04L 61/4511
See application file for complete search history.

(56) References Cited

U.S. PATENT DOCUMENTS

| | | | |
|---|---|---|---|
| 10,951,576 B1 * | 3/2021 | Mutnuru | H04L 43/0852 |
| 2017/0134253 A1 * | 5/2017 | Wang | H04L 67/10 |
| 2018/0159820 A1 * | 6/2018 | White | H04L 61/5007 |
| 2020/0007628 A1 * | 1/2020 | Arunachalam | H04W 48/14 |
| 2020/0329008 A1 * | 10/2020 | Dao | H04L 61/5007 |
| 2021/0243170 A1 * | 8/2021 | Puente Pestaña | H04W 8/20 |
| 2021/0282083 A1 * | 9/2021 | Mayyuri | H04L 43/10 |

* cited by examiner

*Primary Examiner* — Johnny B Aguiar
(74) *Attorney, Agent, or Firm* — Baker Botts L.L.P.

(57) ABSTRACT

A system to distinguish internal network routing issues within a user plane function (UPF) from external routing issues via multi-domain system (DNS) servers probing is disclosed. The system determines latency in communication between a given UPF and each of a plurality of DNS servers. The system compares each latency with a threshold latency value. If it is determined that each of the latencies in communication between the UPF and each DNS server is more than the threshold latency values, the system may determine that there is an internal network routing issue at the UPF that caused the high latencies. If it is determined that a latency in communication between the UPF and a particular DNS server is more than the threshold latency value, the system may determine that the latency is caused by a network routing issue at the particular DNS server—which is external to the UPF.

20 Claims, 5 Drawing Sheets

UPF 132a

| UPF LOCATION IDENTIFIER 210 | TEST TYPE 212 | SOURCE IP ADRESS 214 | TARGET IP ADRESS 216 | LATENCY (IN MS) 154 | RESULT 218 |
|---|---|---|---|---|---|
| DENVER | PING | 1.2.3.4 | 1.2.3.5 | 5.5 (154a) | PASS |
| ... | ... | ... | ... | ... | ... |
| CHICAGO | PING | 1.2.3.4 | 1.2.3.5 | 13.4 (154c) | PASS |

UPF 132b

UPF 132a

| UPF LOCATION IDENTIFIER 210 | TEST TYPE 212 | SOURCE IP ADRESS 214 | TARGET IP ADRESS 220 | LATENCY (IN MS) 154 | RESULT 218 |
|---|---|---|---|---|---|
| DENVER | PING | 1.2.3.4 | 1.2.3.6 | 6.8 (154b) | PASS |
| ... | ... | ... | ... | ... | ... |
| CHICAGO | PING | 1.2.3.4 | 1.2.3.6 | 15.9 (154d) | PASS |

UPF 132b

DISTINGUISHING INTERNAL AND EXTERNAL NETWORK DELAYS VIA MULTI-DOMAIN NAME SYSTEM (DNS) SERVER LATENCY PROBING

TECHNICAL FIELD

The present disclosure relates generally to wireless communication, and more specifically to distinguishing internal and external network delays via multi-domain name system (DNS) server probing.

BACKGROUND

As part of a fifth-generation (5G) network, a user plane function (UPF) is implemented to act as a gateway between the 5G core network and external networks and/or user equipment (UEs). The UPF handles user data traffic to the Internet. The UPF also processes and forwards user data packets within the 5G network and manages tasks such as packet routing, forwarding, and quality of service (QOS) enforcement. In some cases, there may be a delay in downlink (DL) transmission. It is challenging to determine the source of the delay.

SUMMARY

The system described in the present disclosure provides several practical applications and technical advantages that overcome the current technical problems in wireless communication technology as described herein. The following disclosure is particularly integrated into a practical application of distinguishing internal network routing issues or problems within a user plane function (UPF) from external network routing issues or problems via multi-domain name system (DNS) server probing. Identifying whether a network routing issue is internal or external with respect to a UPF improves the diagnosis of the network routing issue. For example, by identifying whether a network routing issue is internal or external with respect to a UPF, the network routing issue can be addressed (and perhaps resolved) faster and more efficiently compared to the current techniques. Furthermore, the disclosed system improves the operations of the UPF, such as data communication with terminal devices, such as user equipment (UEs).

In an example scenario, assume that a user of the UE wants to load a website on the UE. To this end, the user may input a domain name of the website to a web browser application on the UE. The UE sends an uplink (UL) transmission to the base station, the base station sends the UL to a radio access network (RAN), and RAN may send the UL to a UPF (or UPF node where the UPF is deployed). The UPF may send the domain name of the website to the DNS server. The UL may include information about the domain name of the website, among other information. The domain name of the website may be used to locate a cloud server/database where the website is hosted. To this end, a fetch request may be made to a DNS server. The DNS server is configured to convert the domain name of the website into a corresponding internet protocol (IP) address. In other words, the DNS server may return the IP address of the website when given the domain name of the website. The IP address of the website may be used to locate the cloud server/database where the website is hosted. Upon locating the cloud server/database where the website is hosted, information associated with the website may be fetched and loaded on to the web browser on the UE. In some cases, the website may not load or may load with long delay/latency (e.g., more than one second, two seconds, etc.). This may be due to network routing problems or issues at the UPF node and/or at a DNS server. To address and reduce this latency, it is desired to determine whether the network routing problem is due to an internal network routing issue at the UPF or an external network routing issue at the DNS server.

The disclosed system is configured to provide a technical solution to these and other technical problems currently arising in the realm of wireless communication technology. For example, the disclosed system is configured to determine whether the network routing problem is due to an internal network routing issue at the UPF or due to an external network routing issue at the DNS server by probing or pinging multiple DNS servers. To this end, the disclosed system causes each of the UPFs to ping each DNS server. In this process, each UPF may transmit a data packet to a DNS server. Each UPF may receive an acknowledgment message from a DNS server. The total time from when a data packet is sent to a DNS server until a respective acknowledgment message is received may be referred to as a round-trip time, i.e., the latency value. In this manner, the UPF may determine the respective latency value when probing or pinging each DNS server.

The disclosed system may compare each latency value with a threshold latency value (e.g., 10 milliseconds (ms) 15 ms, etc.). If each of both latency values is more than the threshold value, it may be determined that the latency values are due to internal network routing issues at the UPF. This may be because communication with both DNS servers was associated with a high latency value. Therefore, it is unlikely that the network routing at the DNS servers caused the high latency values. On the other hand, if it is determined that only one of the latency values is more than the threshold latency value, it may be an indication that the high latency value is due to the network routing through the DNS server that is associated with the high latency value. It may also be an indication that internal network routing at the UPF has not caused the high latency. In this manner, the disclosed system distinguishes the internal network routing problems from the external network routing problems via multi-DNS server probing.

Accordingly, the disclosed system provides a practical application of distinguishing the internal network routing problems from external network routing problems via multi-DNS server probing and determining a source and location of the network routing problem. In response to determining the source and location of the network routing problem, the disclosed system may address and reduce the network routing problem. For example, in some embodiments, the disclosed system may communicate an alert message that addresses the internal network routing problem by indicating that the high latency is due to internal network routing problem at a UPF. The alert message may be sent to the identified UPF, a computer device associated with an operator associated with the UPF, and the like. In another example, in some embodiments, the disclosed system may communicate an alert message that addresses the external network routing problem by indicating that the high latency is due to external network routing problem at a DNS server. The alert message may be sent to the identified DNS server, a computing device associated with an operator associated with the DNS server, and the like.

In this manner, the disclosed system improves the underlying operations of the UPFs, DNS servers, and the network communication provided by the UPFs and DNS servers to the UE. For example, by detecting the source and location of the network routing problem faster and more efficiently compared to the current techniques, the network routing problem may be addressed (and perhaps resolved) faster and more efficiently compared to the current techniques. Furthermore, by providing a solution to address the network routing problem, the operations of the UPFs and DNS servers are improved-which leads to improving the quality of data communication at the UPFs and DNS servers and reducing network interruptions, congestions, and long delays in the wireless communications. This further leads to increasing the quality of service (QOS) in downlink (DL) transmission of data to load websites on UEs.

In certain embodiments, an apparatus for detecting and addressing latency in network routing comprises a jump server. The jump server is communicatively coupled to a plurality of DNS servers comprising a first DNS server and a second DNS server. The jump server comprises a memory operably coupled to a processor. The memory is configured to store a threshold latency value. The processor is configured to receive an input file comprising a first internet protocol (IP) address associated with the first DNS server, a second IP address associated with the second DNS server, and an identifier associated with a first user plane function (UPF). The processor is further configured to cause the first UPF to transmit a first data packet to the first DNS server. The processor is further configured to cause the first UPF to transmit a second data packet to the second DNS server. The processor is further configured to determine a first latency value associated with the first data packet routing to the first DNS server. The processor is further configured to determine a second latency value associated with the second data packet routing to the second DNS server. The processor is further configured to compare the first latency value with the threshold latency value. The processor is further configured to compare the second latency value with the threshold latency value. The processor is further configured to determine whether each of the first latency value and the second latency value is more than the threshold latency value. In response to determining that each of the first latency value and the second latency value is more than the threshold latency value, the processor is further configured to determine that the first latency value and the second latency value are caused by an internal network routing issue with respect to the first UPF. The processor is further configured to addresses the internal network routing issue with respect to the first UPF. In certain embodiments, the processor is further configured to determine that the first latency value is more than the threshold latency value and determine that the second latency value is less than the threshold latency value. In response to determining that the first latency value is more than the threshold latency value and that the second latency value is less than the threshold latency value, the processor is further configured to determine that the first latency value is caused by the first DNS server. The processor is further configured to address the first latency value caused by the first DNS server.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an example table of delays in communication with a first DNS server of the system of FIG. 1;

FIG. 3 illustrates an example table of delays in communication with a second DNS server of system of FIG. 1;

DETAILED DESCRIPTION

As described above, previous technologies fail to provide efficient and reliable solutions for distinguishing internal and external network routing issues with respect a user plane function (UPF) vis multi-domain name system (DNS) server probing. Embodiments of the present disclosure and its advantages may be understood by referring to FIGS. 1 through 7. FIGS. 1 through 7 are used to describe systems and methods for distinguish internal and external network routing issues with respect a UPF vis multi-DNS server probing.

System Overview

Figure 1:
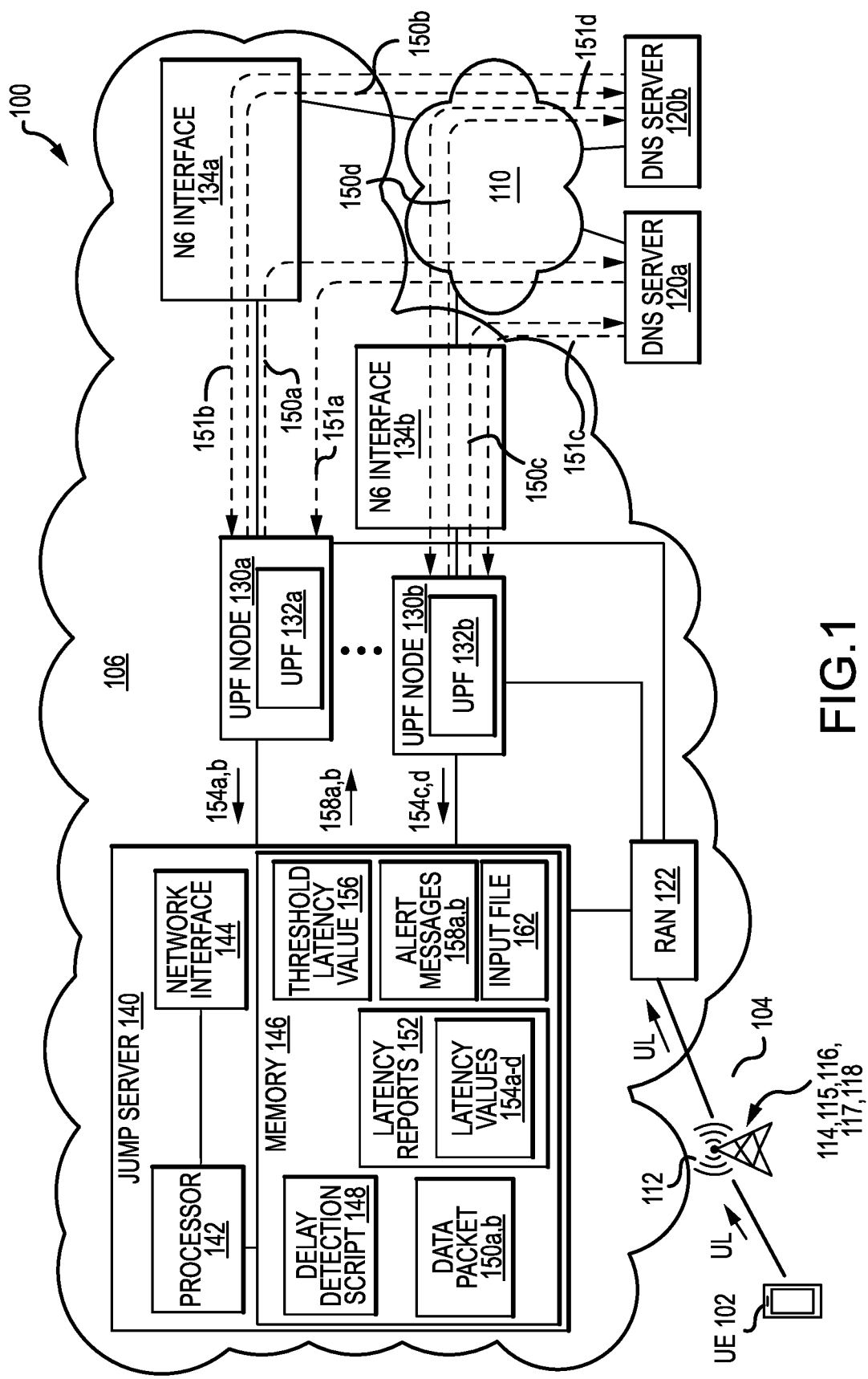
FIG. 1 illustrates an embodiment of a system configured to distinguish internal and external network routing issues with respect to a user plane function (UPF) via multi-domain name system (DNS) server probing.

FIG. 1 illustrates an embodiment of a communication system 100 that is generally configured to determine delays in network communication between a user plane function (UPF) 132a,b and multiple domain name system (DNS) servers 120a,b and determine whether the delay is due to internal network routing issues at a given UPF 132a,b or external network routing issues at the DNS server 120a,b. In other words, the system 100 is configured to distinguish internal and external network routing issues with respect a UPF 132 vis multi-DNS server 120a,b probing and pinging. In certain embodiments, if it is determined that network communications from the UPF 132a,b with multiple DNS servers 120a,b have delays more than a threshold latency value, the system 100 may determine that the delays are due to an internal network routing issues with respect to the UPF 132a,b (or the UPF node 130a,b where the UPF 132a,b is deployed, respectively). Otherwise, if it is determined that one network communication from the UPF 132a,b to one of the DNS servers 120a,b has a delay of more than a threshold latency value, the system 100 may determine that the delay is due to an external network routing issues with respect to the UPF 132a,b.

In some embodiments, the system 100 comprises a jump server 140 communicatively coupled with a user equipment (UE) 102, a cell site 104 that includes a base station 112, a radio access network (RAN) 122, one or more UPF nodes 130a-b where UPFs 132a-b are deployed, respectively. N6 interface 134a-b, multiple DNS servers 120a-b, via a network 110, internal network 106, and/or any suitable wired and/or wireless connection. In other embodiments, system 100 may not have all of the components listed and/or may have other elements instead of, or in addition to, those listed above. The cell site 104 may be part of a fifth generation (5G) base station 112 (also referred to as gNB, eNB, eNode, etc.) and may include a base station 112 tower. Network 110 enables communication between components within the internal network 106 with external component of the system 100. Internal network 106 enables communication among internal components associated with an organization. RAN 122 enables communication between base stations 112 and 5G network. Jump server 140 includes a processor 142 in signal communication with a memory 146. Memory 146 stores delay detection script 148 that when executed by the processor 142 cause the processor 142 to perform one or more operations of the jump server 140 described herein.

In general, the system 100 improves the wireless communication between UPFs 132a-b, UEs 102, base stations 112, DNS servers 120a,b, and RAN 122. In an example scenario, assume that a user of the UE 102 wants to load a website on the UE 102. To this end, the user may input a domain name of the website to a web browser application on the UE 102. The UE 102 sends a uplink (UL) to the base station 112, base station 112 sends the UL to the RAN 122, and RAN 122 may send the UL to the UPF node (i.e., UPF node 130a-b). The UPF node may send the domain name of the website to the DNS server 120a-b. The UL may include information about the domain name of the website, among other information. The domain name of the website may be used to locate a cloud server/database where the website is hosted. To this end, a fetch request may be made to a DNS server 120a-b. The DNS server 120a-b is configured to convert the domain name of the website into a corresponding internet protocol (IP) address. In other words, the DNS server 120a-b may return the IP address of the website when given the domain name of the website. The IP address of the website may be used to locate the cloud server/database where the website is hosted. Upon locating the cloud server/database where the website is hosted, information associated with the website may be fetched and loaded to the web browser on the UE 102. In some cases, the website may not load or may load with long delay/latency (e.g., more than one second, two seconds, etc.). This may be due to network routing problems or issues at the UPF node 130a-b and/or at a DNS server 120a-b. To address, remedy, and troubleshoot (e.g., reduce) this latency, it is desired to determine whether the network routing problem is due to an internal network routing issue at the UPF 132a,b or due to an external network routing issue at the DNS server 120a-b.

The system 100 is configured to provide a technical solution to these and other technical problems currently arising in the realm of wireless communication technology. For example, the system is configured to determine whether the network routing problem is due to an internal network routing issue at the UPF 132a,b or due to an external network routing issue at the DNS server 120a-b. To this end, the system 100, via the jump server 140, executes the delay detection script 148. For example, when the delay detection script 148 is executed, the jump server 140 causes each of the UPFs 132a-b to ping each DNS server 120a-b. In this process, each UPF 132a-b may transmit a data packet 150a-d to a DNS server 120a-b. Each UPF 132a-b may receive an acknowledgment message from a DNS server 120a-b. The total time from when a data packet 150a-d is sent to a DNS server 120a-b until a respective acknowledgment message is received may be referred to as a round-trip time, i.e., the latency value 154a-d. In this manner, the UPF 132a-b may determine the respective latency value 154a-d.

The UPF 132a-b may then transmit a latency report that includes a latency value 154a-d to the jump server 140.

The jump server 140 may compare each latency value 154a-d with a threshold latency value 156 (e.g., 10 milliseconds (ms) 15 ms, etc.). If each of both latency values 132a-b is more than the threshold latency value 156, it may be determined that the latency values 132a-b are due to internal network routing issues at the UPF 132a,b. This may be because communication with both DNS servers 120a-b was associated with a high latency value 132a-b. Therefore, it is unlikely that the network routing at the DNS servers 120a-b caused the high latency values 132a-b. On the other hand, if it is determined that only one of the latency values 132a-d is more than the threshold latency value 156, it may be an indication that the high latency value 154a-d is due to the network routing through the DNS server 120a-b that is associated with the high latency value 154a-d. It may also be an indication that internal network routing at the UPF 132a-b has not caused the high latency 154a-d. In this manner, the system 100 distinguishes the internal network routing problems from the external network routing problems via multi-DNS server probing.

Accordingly, the system 100 provides a practical application of distinguishing the internal network routing problems from external network routing problems via multi-DNS server probing and determining a source and location of the network routing problem. In response to determining the source and location of the network routing problem, the system 100 may remedy, address, and troubleshoot the network routing problem. For example, in some embodiments, the system 100 may communicate an alert message that addresses the internal network routing problem by indicating that the high latency is due to internal network routing problem at a UPF 132a-d, where the alert message is sent to the identified UPF 132a-b, a computer device associated with an operator associated with the UPF 132a-b, and the like. In another example, in some embodiments, the system 100 may communicate an alert message that addresses the external network routing problem by indicating that the high latency is due to external network routing problem at a DNS server 120a-b, where the alert message is sent to the identified DNS server 120a,b, a computing device associated with an operator associated with the DNS server 120a-b, and the like.

In this manner, the system 100 improves the underlying operations of the UPFs 132a, b, DNS servers 120a-b, and the network communication provided by the UPFs 132a-b, DNS servers 120a-b to the UE 102. For example, by detecting the source and location of the network routing problem faster and more efficiently compared to the current techniques, the network routing problem may be addressed (and perhaps resolved) faster and more efficiently compared to the current techniques. Furthermore, by providing a solution to address the root cause of the network routing problem, the operations of the UPFs 132a-b and DNS servers 120a-b are improved-which leads to improving the quality of data communication at the UPFs 132a-b and DNS servers 120a-b and reducing network interruptions, congestions, and long delays in the wireless communications. This further leads to increasing the quality of service (QoS) in downlink (DL) transmission of data to load websites on UEs 102.

System Components

Example UE

A UE 102 may generally be any network device that is configured to communicate data with the base station 112. The UE 102 may be operated by a user. Some examples of the UE 102 may, include, but are not limited to, computing devices, smartphones, tablets, notebook computers, mobile devices, sensors, vehicles, autonomous vehicles, machinery, appliances, smart speakers, digital assistants, security cameras, monitoring devices, home electronics, media players, receiving devices, set-top boxes, other computing devices and IoT devices, etc. The UE 102 may be operated by a user and communicate with other devices connected to the network 110 and/or base station 112. The UE 102 may be a long-term evolution (LTE) component, 4th generation (4G), 5th generation (5G), new radio (NR) 5G component.

The UE 102 may include a hardware processor, memory, and/or circuitry (not explicitly shown) configured to perform any of the functions or actions of the UE 102 described herein. For example, a software application designed using software code may be stored in the memory and executed by the processor to perform the functions of the UE 102. The UE 102 is configured to communicate with other devices and components of the system 100 via the base station 112. A user may use the UE 102 to access the internet, for example, via the network 110.

Example Base Station

Base station 112 may be a network node, an access point, an NB, an eNB, eNodeB, gNB or other types of wireless access points, and is generally configured to enable wireless communication between the UE 102 and other components of the system 100. The base station 112 may serve communication to devices within a serving cell that defines a corresponding coverage area of the serving cell. The base station 112 may be a serving base station for UE(s) 102, user devices, mobile devices, collectively referred to herein as UEs 102. When a UE 102 is within a coverage area associated with a particular base station 112, the base station 112 provides communication coverage to the UE 102. For example, when the UE 102 comes into the cell associated with the base station 112, the UE 102 may communicate with the base station 112 by transmitting UL to the base station 112 and receive a downlink (DL) from the base station 112. As the UE 102 travels between cells, the base stations 112 performs the handover procedure to hand over facilitating the communication of the UE 102 with other devices.

In certain embodiments, the base station 112 may be configured to facilitate cellular networks, 4G, 5G, NR 5G, 3GPP, and other wireless protocols. In certain embodiments, the base station 112 may also include a transceiver 114, a transmission filter 115, a receiving filter 116, memory resources 117, and processing resources 118 to facilitate operations of the base station 112, such as to transmit and receive mobile communication signals, and/or any other signals. For example, the transceiver 114 may include a processing circuitry configured to transmit signals (e.g., mobile communication signals) to UEs 102, other base stations 112, and to other communication systems to enable mobile communication and access to the network 110. The transmission filter 115 includes a bandpass filter with a strict passband. The passband corresponds to the bandwidth that is assigned for the base station 112. Any signals with frequencies outside the passband are filtered so that they are not transmitted from the base station 112. The receiving filter 116 includes a bandpass filter configured to ensure that the base station 112 will reject any signals outside of its designated bandwidth. Accordingly, the receiving filter 116 is a bandpass filter with a strict bandwidth corresponding to the assigned bandwidth of the base station 112. The memory resources 117 include one or more computer-readable media that store software instructions for establishing a mobile communication network with the base station 112. The processing resources 118 may include one or more processing circuitry configured to execute the software instructions stored in the one or more computer-readable media of the memory resources 117 to perform wireless communication functions of the base station 112.

Example Network

Network 110, in general, may be a wide area network (WAN), a personal area network (PAN), a cellular network, or any other technology that allows devices to communicate electronically with other devices. In one or more embodiments, the network 170 may be the Internet. The network 110 may be any suitable type of wireless and/or wired network. The network 110 may be a combination of one or more public and/or private networks, including a local area network (LAN), a metropolitan area network (MAN), a wide area network (WAN), and the like.

Example DNS Server

Each of the DNS servers 120a-b may be an instance of a DNS server 120. Each DNS server 120a-b may include a hardware computing device that is configured to receive a domain name (e.g. example.com) of a website and return an IP address associated with the domain name of the website. In this manner, the DNS server 120a-b may provide a DNS service to a requesting device that requested to receive an IP address of a domain name. The DNS server 120a-b may store a database of domain names, each linked to a respective IP address. When a domain name is received at the DNS server 120a-b, it may search for the domain name in the database. In response to finding the domain name, the DNS server 120a-b may fetch and return the IP address of the domain name to the requesting device.

The DNS server 120a-b may include a hardware processor, memory, and/or circuitry (not explicitly shown) configured to perform any of the functions or actions of the DNS server 120a-b described herein. For example, a software application designed using software code may be stored in the memory and executed by the processor to perform the functions of the DNS server 120a-b. The DNS server 120a-b is configured to communicate with other devices and components of the system 100 via the network 110.

Example RAN

RAN 122 may be implemented in one or more hardware computer devices, such as a server farm, and is generally configured to connect terminal devices (such as UEs 102) to the core network infrastructure, such as 5G core network infrastructure. The RAN 122 may comprise various types of facilities including cell sites, such as cell site 104. These facilities connect mobile users and wireless devices, such as UE 102 to the main core network, which may comprise at least a part of network(s) 106. RAN 122 is communicatively coupled with the jump server 140, UPF nodes 130a,b, and base stations 112, via wires or wireless connection which may be a part of the internal network 106.

The internal network 106 may correspond to private network infrastructure of an organization that facilitates the wireless communication of the UE 102. For example, the internal network 106 may include local area network (LAN), wide area network (WAN), etc. to which computing nodes of the organization may be connected. The private network 106 of the organization may be connected to the Internet, which also may be part of the network 110.

In the illustrated examples, one UE 102 is shown for illustrative purposes, but many additional UEs are present in various embodiments. The network devices of the RAN 122 are configured to facilitate the wireless communication between terminal devices (e.g., UEs 102) and the core network infrastructure. The RAN 122 provides an interface between the UEs 102 and the core network infrastructure, facilitating the transmission and reception of voice, data, and multimedia services. The RAN 122 also enables mobile connectivity and supports various wireless communication standards, such as 2G, 3G, 4G (LTE), and 5G.

Example UPF

Each UPF 132a,b is deployed in a respective UPF node 130a,b. Each of the UPF nodes 130a-b may be an instance of a UPF node 130. A UPF node 130 may include a hardware computing device, such as a server, a network node, and the like. The UPF node 130a-b may be configured to handle user data plane, including forwarding, routing, and processing of data packets within the internal network 106 and from inside the network 106 to the external/public network 110. Each UPF node 130a-b may maintain a respective UPF 132a-b in its memory. For example, the UPF node 130a maintains the UPF 132a, and the UP node 130b maintains the UPF 132b.

The UPF 132a-b may act as a gateway between the 5G core network and external networks and/or UEs 102. This allows packet processing and traffic aggregation to be performed closer to the network edge, increasing bandwidth efficiencies while reducing network congestion. Each UPF node 130a-b may be located in a different geographical area and serve to facilitate network communication of UEs 102 in that geographical area. For example, each UPF node 130a-b may be located in a different city compared to other UPF nodes. Each UPF node 130a-b may be communicatively coupled with the jump server 140 via wires and/or wireless connection implemented by the internal network 106. Each UPF node 130a-b may communicate respective latency values 154a-d to the jump server 140, similar to that shown in FIG. 1. For example, the UPF node 130a may communicate latency values 154a-b to the jump server 140, and the UPF node 130b may communicate latency values 154c-d to the jump server 140.

Each UPF node 130a-b may be communicatively coupled with the RAN 122 via wires and/or wireless connection implemented by the internal network 106. Each UPF node 130a-b may communicatively be coupled to DNS servers 120a-b via N6 interface 134a-b, respectively, and the network 110. N6 interface 134a-b may be a portion of the 5G network that carries data from UPF to the internet (e.g., network 110) and/or to the access and mobility management function (AMF) (not explicitly shown). The N6 interface 134a-b may handle the communication of user data and control data between UPF and AMF. Some examples of N6 interface 134a-b may include LAN, 5G, 4G, LTE, 3GPP interfaces. The N6 interface 134a-b may include a firewall to block unauthorized network traffic to any component within the internal network 106 and/or the UE 102.

Example Jump Server

Jump server 140 may be implemented by one or more hardware computing devices and is generally configured to detect latency values 154a-d associated with network communications between the UPF nodes 130a-b and DNS servers 120a-b, determine whether the latency value 154a-b is more than the threshold latency value 156, and differentiate/distinguish internal network routing problems at a UPF 132a-b from external network routing problems at DNS server 120a-b based on determining whether communication with both DNS server 120a-b resulted in latency values 154a-d more than the threshold latency value 156 or only a communication with one DNS server 120a-b resulted in a latency value 154a-d higher than the threshold latency value 156. If it is determined that communication with both DNS server 120a-b resulted in latency values 154a-b more than the threshold latency value 156, the jump server 140 may determine that the latency values are due to an internal network routing issue at the identified UPF 132a-b. Otherwise, if it is determined that only a communication with a particular DNS server 120a-b resulted in a latency value 154a-d higher than the threshold latency value 156, the jump server 140 may determine that the latency value is due to an external network routing issue at the particular DNS server 120a-b.

In certain embodiments, the jump server 140 may be implemented by a cluster of computing devices located in a server farm. For example, the jump server 140 may be implemented by a plurality of computing devices using distributed computing and/or cloud computing systems in a network of base stations 112. In certain embodiments, the jump server 140 may be implemented by a plurality of computing devices in one or more data centers. The jump server 140 may be formed by one or more physical devices configured to provide services and resources (e.g., data and/or hardware resources) for the components of the system 100.

The jump server 140 comprises a processor 142 operably coupled with a network interface 144 and a memory 146. Processor 142 may include one or more specialized and/or general-purpose processors configured to perform one or more operations of the jump server 140 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 1 may be performed using one or more processors. As such, for example, functions of the jump server 140 may be performed by the processor 142. The processor 142 is configured to operate as described in FIGS. 1-7. For example, the processor 142 may be configured to perform one or more operations of the operational flow of the system 100 described in FIG. 1 and one or more operations of the method 600 as described in FIG. 6.

Network interface 144 is configured to enable wired and/or wireless communications. The network interface 144 communicatively couples the jump server 140 to other devices, such as some or all of the components of the system 100. The network interface 144 may communicate over any type of network topology and communication link. The network interface 144 is configured to transmit and receive data from and to other devices, for example, the network interface 144 may include a wireless fidelity (WiFi) modem, a WiFi interface, a fifth generation (5G) modem, a 5G interface, a new radio (NR) 5G modem, a NR 5G interface, a fourth generation (4G) modem, a 4G interface, a long-term evolution (LTE) modem, a LTE interface, a local area network (LAN) modem, a LAN interface, a metropolitan area network (MAN) modem, a MAN interface, a wide area network (WAN) modem, WAN interface, and any other suitable type of communication protocol.

The memory 146 may include a machine-readable medium having stored thereon instructions which may be used to program a computer (or other electronic devices) to perform a process. The machine-readable medium may include, but is not limited to, floppy diskettes, optical disks, compact disc read-only memories (CDROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions and data. The memory 146 may store any of the information described in FIGS. 1-7 along with any other data, instructions, logic, rules, or code operable to implement the function(s) described herein when executed by processor 142. For example, the memory 146 may store delay detection script 148, data packets 150a,b, latency reports 152, threshold latency value 156, alert messages 158a,b, and input file 162, and/or any other data or instructions. The delay detection script 148 may comprise any suitable set of instructions, logic, rules, or code operable to execute the operations of processor 142 and perform the functions described herein, such as some or all of those described in FIGS. 1-7.

Example Operational Flow for Distinguishing Internal and External Network Routing Issues Via Multi-DNS Server Probing.

The operational flow of system 100 for distinguishing internal network routing problems (at a UPF 132a,b) from external network routing problems (at a DNS server 120a,b) via multi-DNS server 120a,b probing is described below. In operation, to determine and diagnose whether there is a network routing problem and if it is internal or external with respect to the UPF 132a-b (and/or the internal network 106), the jump server 140 may execute the delay detection script 148. To this end, the jump server 140 may receive an input file 162, for example, from a user. The jump server 140 may feed the input file 162 to the delay detection script 148. The input file 162 may include a list of identifiers of geographical regions (e.g., names of the geographical regions, such as Denver, Chicago, etc.) where the UPFs 132a-b are deployed and IP addresses of the DNS servers 120a-b. For example, the input file 162 may include an IP address of the DNS server 120a, an IP address of the DNS server 120b, and identifiers of geographical locations where the UPFs 132a-b are deployed. The jump server 140 may execute the delay detection script 148. Upon the execution of the delay detection script 148, the jump server 140 may perform one or more operations below.

The jump server 140 (e.g., via the delay detection script 148) may identify the UPF nodes 130a-b and UPFs 132a-b using the identifiers of the geographical locations where the UPFs 102a-b are deployed. The jump server 140 may then perform operations to determine a round-trip time delay (e.g., latency values 154a-d) between each UPF 132a-b and a given DNS server 120a-b. In other words, each UPF 132a-b pings each DNS server 120a-b in an attempt to receive a response and determine an RTT delay for each DNS server 120a-b. In this operation, the jump server 140 may cause each UPF 132a-b to transmit a data packet to 150 to DNS server 120a-b.

Probing the First DNS Server

For example, regarding the UPF 132a, the jump server 140 may cause the UPF 132a to transmit the data packet 150a to the DNS server 120a traversing via the N6 interface 134a and network 110 to reach the DNS server 120a, and transmit the data packet 150b to the DNS server 120b traversing via the N6 interface 134a and network 110 to reach the DNS server 120b. The DNS server 120a may return an acknowledgment message 151a to the UPF 132a indicating that it received the data packet 150a. Similarly, the DNS server 120b may return an acknowledgment message 151b to the UPF 132a indicating that it received the data packet 150b.

In some embodiments, the UPF 132a may determine the latency value 154a based on the communication with the DNS server 120a, and determine the latency value 154b based on the communication with the DNS server 120b. The latency value 154a may correspond to the time from when the data packet 150a was sent to the DNS server 120a until when the acknowledgment message 151a was received at the UPF 132a. The latency value 154b may correspond to the time from when the data packet 150b was sent to the DNS server 120b until when the acknowledgment message 151b was received at the UPF 132a. The UPF 132a may transmit the latency values 154a,b to the jump server 140. The delay detection script 148 may compile the latency values 154a,b in a latency report 152. In this manner, the jump server 140 may receive and access the latency report 152 associated with the UPF 132a when probing DNS servers 120a-b.

An example of the latency report 152 outputted by the delay detection script 148 when determining latency values between the UPF 132a-b and the DNS server 120a is illustrated in FIG. 2. Referring to FIG. 2, the example latency report 152 includes columns for UPF location identifiers 210, test type 212, source IP address 214, target IP address 216, latency (in millisecond (ms)) 154, and results 218. The rows of the latency report 152 in FIG. 2 include information with respect to communication between each UPF 132a-b and DNS server 120a. The first row includes information about the UPF 132a, DNS server 120a, and the latency in communication between them. In the first row, the UPF location identifier 210a indicates that the location of UPF 132a is Denver, the test type 212 is ping, the source IP address 214 is the IP address of the UPF 132a (e.g., 1.2.3.4), the target IP address 216 is the IP address of the DNS server 120a (e.g., 1.2.3.5), the latency 154a is 5.5 ms, and the result of the communication between the UPF 132a and DNS server 120a is "pass" indicating that the acknowledgment message was received from the DNS server 120a. Other rows between the first and the last row are shown by dots, indicating that the latency report 152 may include any number of rows, where each row is for a different UPF 132. The last row includes information about the UPF 132b, DNS server 120a, and the latency in communication between them. In the last row, the UPF location identifier 210b indicates that the location of UPF 132b is Chicago, the test type 212 is pinged, the source IP address 214 is the IP address of the UPF 132b (e.g., 1.2.3.4), the target IP address 216 is the IP address of the DNS server 120a (e.g., 1.2.3.5), the latency 154c is 13.4 ms, and the result of the communication between the UPF 132b and DNS server 120a is "pass" indicating that the acknowledgment message was received from the DNS server 120a. In this manner, the latency in communication between each UPF 132a-b and the DNS server 120a is determined by the jump server 140 executing the delay detection script 148.

Probing the Second DNS Server

Referring back to FIG. 1, the jump server 140 may perform similar operations with respect to the UPF 132b. For example, in response to executing the delay detection script 148, the jump server 140 may cause the UPF 132b to transmit the data packet 150c to the DNS server 120a via N6 interface 134b and network 110 to reach the DNS server 120a, and transmit the data packet 150d to the DNS server 120b via the N6 interface 134b and network 110 to reach the DNS server 120b. The DNS server 120a may return an acknowledgment message 151c to the UPF 132b indicating that it received the data packet 150c. Similarly, the DNS server 120b may return an acknowledgment message 151d to the UPF 132*d* indicating that it received the data packet 150*d*. The UPF 132*b* may determine the latency value 154*c* based on the communication with the DNS server 120*a*, and determine the latency value 154*d* based on the communication with the DNS server 120*b*. The latency value 154*c* may correspond to the time from when the data packet 150*c* was sent to the DNS server 120*a* until when the acknowledgment message 151*c* was received at the UPF 132*b*. The latency value 154*d* may correspond to the time from when the data packet 150*d* was sent to the DNS server 120*b* until when the acknowledgment message 151*d* was received at the UPF 132*b*. The UPF 132*b* may transmit the latency values 154*c, d* to the jump server 140. The delay detection script 148 may add the latency values 154*c, d* in a latency report 152. In some embodiments, the operations to determine each of the latency values 154*a-d* may be performed in series or in parallel. In this manner, the jump server 140 may receive and access the latency report 152 associated with the UPF 132*b* when probing DNS servers 120*a-b*.

An example of the latency report 152 outputted by the delay detection script 148 when determining latency values between the UPF 132*a-b* and the DNS server 120*b* is illustrated in FIG. 3. Referring to FIG. 3, the example latency report 152 includes columns for UPF location identifiers 210, test type 212, source IP address 214, target IP address 220, latency (in ms) 154, and results 218. The rows of the latency report 152 in FIG. 3 include information with respect to communication between each UPF 132*a-b* and DNS server 120*b*. The first row includes information about the UPF 132*a*, DNS server 120*b*, and the latency in communication between them. In the first row, the UPF location identifier 210*a* indicates that the location of UPF 132*a* is Denver, the test type 212 is pinged, the source IP address 214 is the IP address of the UPF 132*a* (e.g., 1.2.3.4), the target IP address 220 is the IP address of the DNS server 120*b* (e.g., 1.2.3.6), the latency 154*b* is 6.8 ms, and the result of the communication between the UPF 132*a* and DNS server 120*b* is "pass" indicating that the acknowledgment message was received from the DNS server 120*b*. Other rows between the first and the last row are shown by dots, indicating that the latency report 152 may include any number of rows, where each row is for a different UPF 132. The last row includes information about the UPF 132*b*, DNS server 120*b*, and the latency in communication between them. In the last row, the UPF location identifier 210*b* indicates that the location of UPF 132*b* is Chicago, the test type 212 is pinged, the source IP address 214 is the IP address of the UPF 132*b* (e.g., 1.2.3.4), the target IP address 220 is the IP address of the DNS server 120*b* (e.g., 1.2.3.6), the latency 154*d* is 15.9 ms, and the result of the communication between the UPF 132*b* and DNS server 120*b* is "pass" indicating that the acknowledgment message was received from the DNS server 120*b*. Referring back to FIG. 1, the jump server 140 may determine the latency value 154*a* of the communication between the UPF 132*a* and DNS server 120*a*, and latency value 154*b* of the communication between the UPF 132*a* and DNS server 120*b*.

Evaluating the Latency with Respect to the First UPF

To evaluate the latency with respect to the first UPF 132*a*, the jump server 140 may compare each of the latency values 154*a, b* to the threshold latency value 156. The jump server 140 may determine whether each of the latency values 154*a, b* is more than the threshold latency value 156. If it is determined that the each of the latency values 154*a, b* is more than the threshold latency value 156, the jump server 140 may determine that the latency values 154*a, b* are caused by an internal network routing issue with respect to the UPF 132*a*. In some embodiments, the internal network routing issue may comprise internal network congestion, insufficient allocated network bandwidth, among others.

In response, the jump server 140 may communicate a first alert message 158*a* that addresses the internal network routing issue. For example, the jump server 140 may communicate the alert message 158*a* to a computing device associated with an operator of the UPF 132*a*, the UPF node 130*a*, etc. The alert message 158*a* may indicate that the latency value 154*a, b* is caused by the UPF 132*a*. If it is determined that the latency value 154*a* is more than the threshold latency value 156 and that the latency value 154*b* is less than the threshold latency value 156, the jump server 140 may determine that the latency value 154*a* may be caused by the DNS server 120*a* and due to external network routing issues at the DNS server 120*a* which is external to the UPF 132*a*. In response, the jump server 140 may communicate a second alert message 158*b* that addresses the external network routing issue. For example, the jump server 140 may communicate the alert message 158*b* to a computing device associated with an operator of the DNS server 120*a*. The alert message 158*b* may indicate that the latency value 154*a* is caused by the DNS server 120*a*.

Evaluating the Latency with Respect to the Second UPF

To evaluate the latency with respect to the second UPF 132*b*, the jump server 140 may compare each of the latency values 154*c,d* to the threshold latency value 156, similar to that described above with respect to the latency values 154*a-b*. If it is determined that the each of the latency values 154*c,d* is more than the threshold latency value 156, the jump server 140 may determine that the latency values 154*c,d* are caused by an internal network routing issue with respect to the UPF 132*b*. If it is determined that the latency value 154*c* is more than the threshold latency value 156 and that the latency value 154*d* is less than the threshold latency value 156, the jump server 140 may determine that the latency value 154*c* may be caused by the DNS server 120*a* and due to network routing issues at the DNS server 120*a* which is external to the UPF 132*b*. In response, the jump server 140 may communicate a second alert message 158*b* that addresses the external network routing issue. For example, the jump server 140 may communicate the alert message 158*b* to a computing device associated with an operator of the DNS server 120*a*. The alert message 158*b* may indicate that the latency value 154*c* is caused by the DNS server 120*a*.

Example Script Outputs

Figure 4:
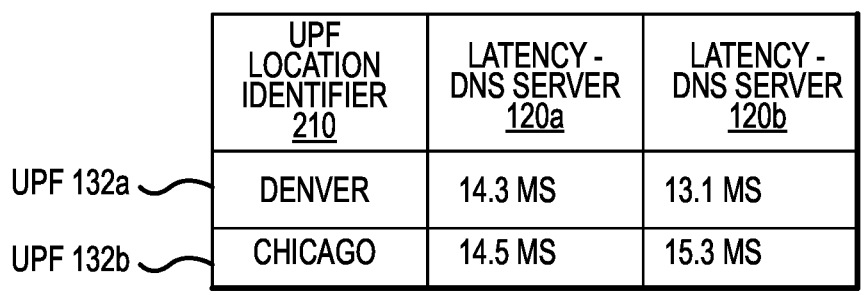
FIG. 4 illustrates an example table of delays in communication with two DNS servers of the system of FIG. 1, where.

FIG. 4 illustrates an example of an output of the delay detection script 148 where the latency values 154*a-d* that are more than the threshold latency value 156 are shown for different UPFs 132*a-b* and DNS servers 120*a-b*. As shown in FIG. 4, the latency in communication between the UPF 132*a* and DNS server 120*a* is 14.3 ms, the latency in communication between the UPF 132*a* and DNS server 120*b* is 13.1 ms, the latency in communication between the UPF 132*b* and DNS server 120*a* is 14.5 ms, and the latency in communication between the UPF 132*b* and DNS server 120*b* is 15.3 ms. Assume that the threshold latency value 156 is 10 ms. In these cases of UPF 132*a-b* shown in FIG. 4, since each of the latency values 156*a-d* is more than the threshold latency value 156, the jump server 140 may determine that the latency values 154*a-d* are due to internal network routing issue at the UPF 132*a* and UPF 132*b*.

Figure 5:
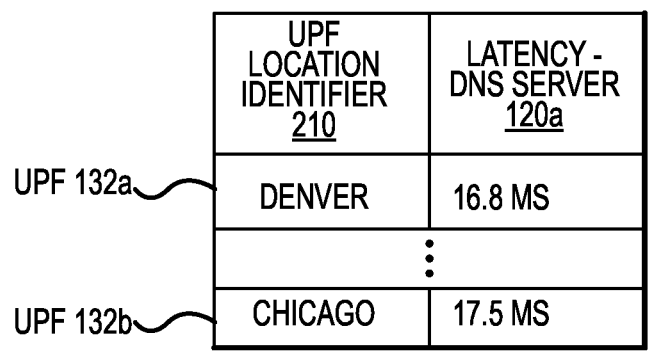
FIG. 5 illustrates an example table of delays in communication with a DNS server of the system of FIG. 1, where the delays are more than a threshold delay.

FIG. 5 illustrates an example output of the delay detection script 148 where latency values 154*a, c* that are more than the threshold latency value 156 are shown for different UPFs 132*a-b* and a DNS server 120*a*. As shown in FIG. 5, the latency in communication between the UPF 132a and DNS server 120a is 16.8 ms and the latency in communication between the UPF 132b and DNS server 120a is 17.6 ms. Assume that the threshold latency value 156 is 10 ms.

In these cases of UPF 132a-b shown in FIG. 5, since only the latency values 154a,c with respect to communication with one DNS server 120a is determined to be more than the threshold latency value 156, the jump server 140 may determine that the latency values 154a,c are due to network routing issue at the DNS server 120a.

Figure 6:
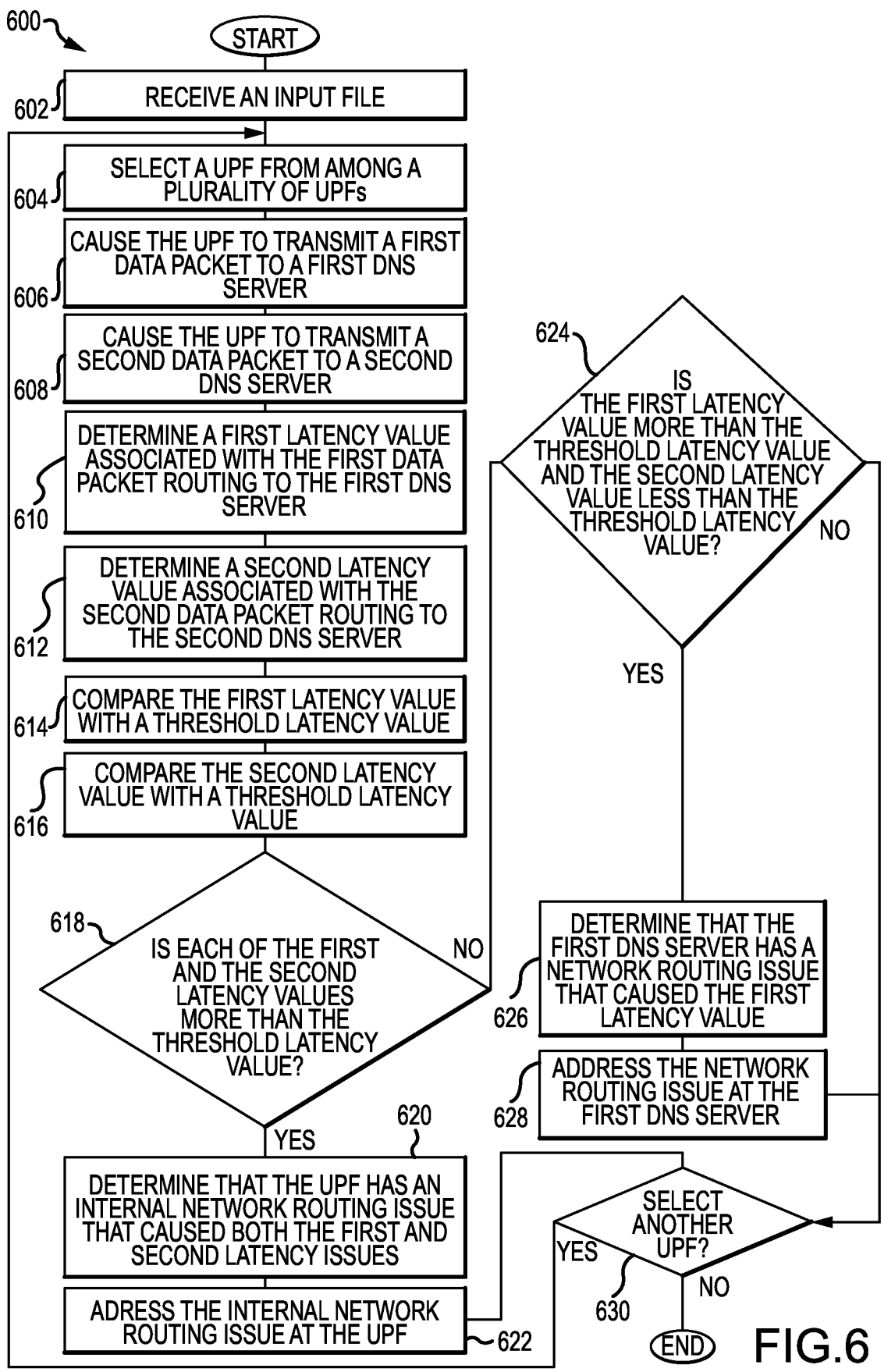
FIG. 6 illustrates an example flow chart of a method for distinguish internal and external network routing issues with respect a UPF vis multi-DNS server probing.

Method for Distinguishing Internal Network Routing Issues from External Routing Issues with Respect to a UPF Via Multi-DNS Server Probing FIG. 6 illustrates an example flowchart of a method 600 for distinguishing internal network routing issues from external routing issues with respect to a UPF via multi-DNS server probing according to some embodiments of the present disclosure. Modifications, additions, or omissions may be made to method 600. Method 600 may include more, fewer, or other operations. For example, operations may be performed in parallel or in any suitable order. While at times discussed as the system 100, jump server 140, UPF nodes 130a,b, DNS servers 120a,b, apparatus, or components of any of thereof performing operations, any suitable system or components of the system may perform one or more operations of the method 600. For example, one or more operations of method 600 may be implemented, at least in part, in the form of delay detection script 148 of FIG. 1, stored on tangible non-transitory computer-readable media (e.g., memory 146 of FIG. 1) that when run by one or more processors (e.g., processor 142 of FIG. 1) may cause the one or more processors to perform operations 602-630.

At operation 602, the jump server 140 receives an input file 162. For example, the jump server 140 may receive the input file 162 as a configuration file to the delay detection script 148. e.g., imported to the jump server 140 by a user. The input file 162 may include IP addresses of the DNS servers 120a,b and a list of identifiers associated with a set of UPFs 132a-b, similar to that described in FIGS. 1-4. The following operations may be performed when the delay detection script 148 is executed by the jump server 140.

At operation 604, the jump server 140 selects a UPF from among the plurality of UPFs 132a-b. The jump server 140 may iteratively select a UPF 132a-b until no UPF 132a-b is left for evaluation. At operation 606, the jump server 140 causes the UPF 132 (e.g., one of the UPFs 132a-b) to transmit a first data packet 150 to the first DNS server 120a. For example, the UPF 132 may ping the DNS server 120a using its IP address, similar to that described in FIGS. 1-4. In response, the UPF 132 may receive an acknowledgment message 151 from the DNS server 120a, if the DNS server 120a is responsive.

At operation 608, the jump server 140 causes the UPF 132 to transmit a second data packet 150 to the second DNS server 120. For example, the UPF 132 may ping the DNS server 120b using its IP address, similar to that described in FIGS. 1-4. In response, the UPF 132 may receive an acknowledgment message 151 from the DNS server 120b, if the DNS server 120b is responsive.

At operation 610, the jump server 140 determines a first latency value 154 associated with the first data packet 150 routing to the first DNS server 120a. For example, the jump server 140 may receive the latency value 154, e.g., RTT delay in communication between the UPF 132 and the DNS server 120a, similar to that described in FIGS. 1-4.

At operation 612, the jump server 140 determines a second latency value 154 associated with the second data packet 150 routing to the second DNS server 120b. For example, the jump server 140 may receive the latency value 154, e.g., RTT delay in communication between the UPF 132 and the DNS server 120b, similar to that described in FIGS. 1-4.

At operation 614, the jump server 140 compares the first latency value 154 with the threshold latency value 156. At operation 616, the jump server 140 compares the second latency value with the threshold latency value 156.

At operation 618, the jump server 140 determines whether each of the first and the second latency values 154 is more than the threshold latency value 156. If it is determined that each of the first and second latency values 154 is more than the threshold latency values 154, method 600 proceeds to operation 620. Otherwise, the method 600 proceeds to operation 624.

At operation 620, the jump server 140 determines that the UPF 132 has an internal network routing issue that caused both the first and second latency values 154. In other words, the jump server 140 determines that the first and second latency values 154 are caused by the internal network routing issue with respect to the UPF 132, similar to that described in FIGS. 1-4.

At operation 622, the jump server 140 addresses the internal network routing issue at the UPF 132. For example, the jump server 140 may communicate an alert message 158 that addresses the internal network routing issue at the UPF 132 to the UPF 132 (or UPF node 130), a computing device associated with an operator of the UPF 132, etc., similar to that described in FIG. 1. In some examples, the jump server 140 may update or revise the internal network resource allocation at the UPF 132 so that the network routing issue is addressed and perhaps resolved. For example, if the network routing issue is due to insufficient network resources (e.g., bandwidth, time domain resources, frequency domain resources, etc.) allocated to communication between the UPF 132 and each DNS server 120a,b, the minimum amount of network resources needed to facilitate communication between the UPF 132 and each of DNS server 120a,b with a latency value 154 less than the threshold latency value 156 may be determined and allocated/added to respective network resources. In some embodiments, this operation may be performed by the jump server 140. In some embodiments, this operation may be performed by the UPF node 130 (and/or the UPF 132), for example, in response to receiving the alert message 158. In case the network routing issue is due to network congestion at the UPF 132, the network routing at the UPF 132 may be updated with a new protocol to reduce the network congestion. In some embodiments, this operation may be performed by the jump server 140. In some embodiments, this operation may be performed by the UPF node 130 (and/or the UPF 132), for example, in response to receiving the alert message 158.

At operation 624, the jump server 140 determines whether the first latency value 154 is more than the threshold latency value 156 and the second latency value 154 is less than the threshold latency value 156. In other words, the jump server 140 determines whether communication with one of the DNS servers 120a,b has a high RTT delay more than the threshold latency value 156. If it is determined that the first latency value 154 is more than the threshold latency value 156 and the second latency value 154 is less than the threshold latency value 156, method 600 proceeds to operation 626. Otherwise, method 600 proceeds to operation 630.

At operation 626, the jump server 140 determines that the first DNS server 120a has a network routing issue that caused the first latency value 154. In other words, the jump server 140 may determine that the network routing issue is external to the UPF 132, not caused by the UPF 132, and caused by the DNS server 120a.

At operation 628, the jump server 140 addresses the network routing issue at the DNS server 120a. For example, the jump server 140 may communicate an alert message 158 that addresses the network routing issue. For example, the jump server 140 may communicate an alert message 158 to the DNS server 120a, a computing device associated with an operator of the DNS server 120a, etc., similar to that described in FIG. 1.

At operation 624, the jump server 140 determines whether to select another UPF 132. The jump server 140 may determine to select another UPF 132 if at least one UPF 132 is left for evaluation in the input file 162. If the jump server 140 determines to select another UPF 132, the method 600 returns to operation 604. Otherwise, the method 600 ends.

Example UPF Node

Figure 7:
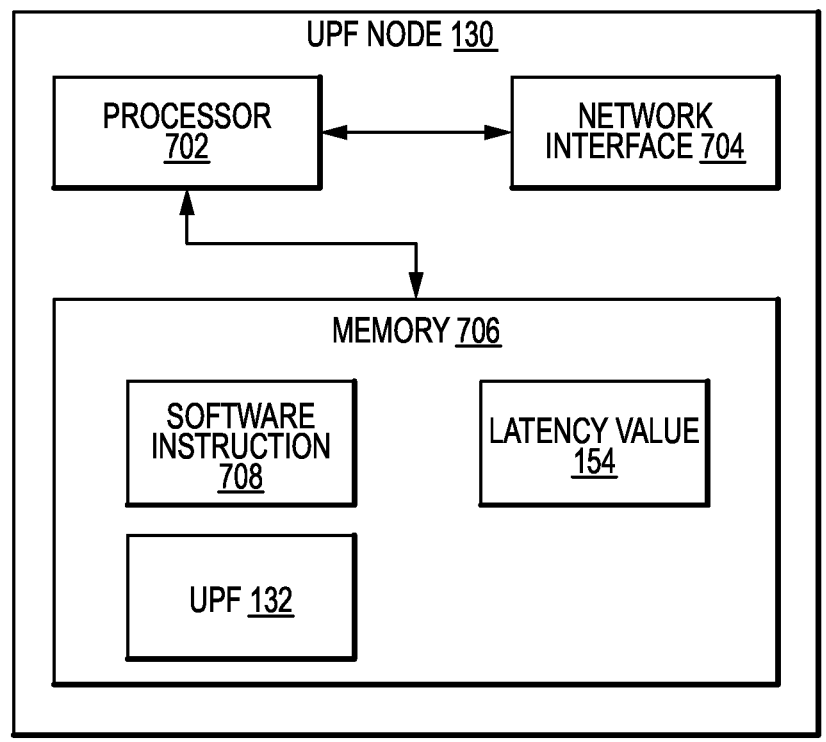
FIG. 7 illustrates an example schematic diagram of a jump server illustrated in FIG. 1, in accordance with one or more embodiments of the present disclosure.

Aspects of the UPF node 130 are described in FIG. 1, and additional aspects are described below. The UPF node 130 may be an instance each UPF node 130a-b. FIG. 7 illustrates an example schematic diagram 700 of the UPF node 130 illustrated in FIG. 1, in accordance with one or more embodiments of the present disclosure. The UPF node 130 may be implemented by one or more hardware computing devices.

In certain embodiments, the UPF node 130 may be implemented by a cluster of computing devices located in a server farm. For example, the UPF node 130 may be implemented by a plurality of computing devices using distributed computing and/or cloud computing systems in a network of base stations. In certain embodiments, the UPF node 130 may be implemented by a plurality of computing devices in one or more data centers. The UPF node 130 may be formed by one or more physical devices configured to provide services and resources (e.g., data and/or hardware resources) for the components of the system 100. The UPF node 130 may be referred to as a breakout edge data center (BEDC) where the UPF 132 is deployed.

The UPF node 130 comprises a processor 702 operably coupled with a network interface 704 and a memory 706. The UPF node 130 may be configured as shown in FIG. 7 or in any other suitable configuration.

Processor 702 may include one or more specialized and/or general-purpose processors configured to perform one or more operations of the UPF node 130 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 1 may be performed using one or more processors. As such, for example, functions of the UPF node 130 may be performed by the processor 702. The processor 702 is configured to operate as described in FIGS. 1-7. For example, the processor 702 may be configured to perform one or more operations of the operational flow of the system 100 described in FIG. 1 and one or more operations of the method 600 as described in FIG. 7.

Network interface 704 is configured to enable wired and/or wireless communications. The network interface 704 communicatively couples the UPF node 130 to other devices, such as some or all of the components of the system 100. The network interface 144 may communicate over any type of network topology and communication link. The network interface 704 is configured to transmit and receive data from and to other devices, for example, the network interface 704 may include a WiFi modem, a WiFi interface, a 5G modem, a 5G interface, a NR 5G modem, a NR 5G interface, a 4G modem, a 4G interface, a LTE modem, a LTE interface, a LAN modem, a LAN interface, a MAN modem, a MAN interface, a WAN modem, WAN interface, and any other suitable type of communication protocol.

The memory 706 may include a machine-readable medium having stored thereon instructions which may be used to program a computer (or other electronic devices) to perform a process. The machine-readable medium may include, but is not limited to, floppy diskettes, optical disks, CDROMs, magneto-optical disks, ROMs, RAMs, EPROMS, EEPROMs, magnetic or optical cards, flash memory, or other type of media/machine-readable medium suitable for storing electronic instructions and data. The memory 706 may store any of the information described in FIGS. 1-7 along with any other data, instructions, logic, rules, or code operable to implement the function(s) described herein when executed by processor 702. For example, the memory 706 may store delay detection script 148, UPF 132, latency values 154, and/or any other data or instructions. The delay detection script 148 may comprise any suitable set of instructions, logic, rules, or code operable to execute the operations of processor 702 and perform the functions described herein, such as some or all of those described in FIGS. 1-7.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus for detecting and addressing latency in network routing, comprising:
   a jump server communicatively coupled to a plurality of DNS servers comprising a first DNS server and a second DNS server, the jump server comprising:

a memory configured to store a threshold latency value; and a processor operably coupled to the memory, and configured to:

receive an input file comprising a first internet protocol (IP) address associated with the first DNS server, a second IP address associated with the second DNS server, and an identifier associated with a first user plane function (UPF);

cause the first UPF to transmit a first data packet to the first DNS server;

cause the first UPF to transmit a second data packet to the second DNS server;

determine a first latency value associated with the first data packet routing to the first DNS server;

determine a second latency value associated with the second data packet routing to the second DNS server;

compare the first latency value with the threshold latency value;

compare the second latency value with the threshold latency value;

determine whether each of the first latency value and the second latency value is more than the threshold latency value; and in response to determining that each of the first latency value and the second latency value is more than the threshold latency value:

determine that the first latency value and the second latency value are caused by an internal network routing issue with respect to the first UPF; and addresses the internal network routing issue with respect to the first UPF.

2. The apparatus of claim 1, wherein the processor is further configured to:

determine that the first latency value is more than the threshold latency value;

determine that the second latency value is less than the threshold latency value;

in response to determining that the first latency value is more than the threshold latency value and that the second latency value is less than the threshold latency value:

determine that the first latency value is caused by the first DNS server; and address the first latency value caused by the first DNS server.

3. The apparatus of claim 1, wherein:

the first latency value comprises a first round-trip time (RTT) delay associated with the first data packet being transmitted from the first UPF to the first DNS server and an acknowledgment message from the first DNS server to the first UPF; and the second latency value comprises a second RTT delay associated with the second data packet being transmitted from the first UPF to the second DNS server and an acknowledgment message from the second DNS server to the first UPF.

4. The apparatus of claim 1, wherein, in response to causing the first UPF to transmit the first data packet to the first DNS server, the first data packet traverses through a first N6 interface and public network to reach the first DNS server.

5. The apparatus of claim 1, wherein, in response to causing the first UPF to transmit the second data packet to the second DNS server, the second data packet traverses through a first N6 interface and public network to reach the second DNS server.

6. The apparatus of claim 1, wherein the internal network routing issue comprises at least one of an internal network congestion or an insufficient allocated network bandwidth.

7. The apparatus of claim 1, wherein the first UPF is deployed on a first network node that is communicatively coupled with the jump server.

8. A method for detecting and addressing latency in network routing, comprising:

receiving an input file comprising a first internet protocol (IP) address associated with a first domain name system (DNS) server, a second IP address associated with the second DNS server, and an identifier associated with a first user plane function (UPF);

causing the first UPF to transmit a first data packet to the first DNS server;

causing the first UPF to transmit a second data packet to the second DNS server;

determining a first latency value associated with the first data packet routing to the first DNS server;

determining a second latency value associated with the second data packet routing to the second DNS server;

comparing the first latency value with a threshold latency value;

comparing the second latency value with the threshold latency value;

determining that each of the first latency value and the second latency value is more than the threshold latency value;

in response to determining that each of the first latency value and the second latency value is more than the threshold latency value:

determining that the first latency value and the second latency value are caused by an internal network routing issue with respect to the first UPF; and addressing the internal network routing issue with respect to the first UPF.

9. The method of claim 8, further comprising:

receiving a second input file comprising the first internet protocol (IP) address associated with the first domain name system (DNS) server, the second IP address associated with the second DNS server, and the identifier associated with the first user plane function (UPF);

causing the first UPF to transmit a third data packet to the first DNS server;

causing the first UPF to transmit a fourth data packet to the second DNS server;

determining a third latency value associated with the third data packet routing to the first DNS server;

determining a fourth latency value associated with the fourth data packet routing to the second DNS server;

comparing the third latency value with the threshold latency value;

comparing the fourth latency value with the threshold latency value;

determining that the third latency value is more than the threshold latency value;

determining that the fourth latency value is less than the threshold latency value;

in response to determining that the third latency value is more than the threshold latency value and that the fourth latency value is less than the threshold latency value:

determining that the third latency value is caused by the first DNS server; and
addressing the third value caused by the first DNS server.

10. The method of claim 8, wherein:
the first latency value comprises a first round-trip time (RTT) delay associated with the first data packet being transmitted from the first UPF to the first DNS server and an acknowledgment message from the first DNS server to the first UPF; and
the second latency value comprises a second RTT delay associated with the second data packet being transmitted from the first UPF to the second DNS server and an acknowledgment message from the second DNS server to the first UPF.

11. The method of claim 8, wherein, in response to causing the first UPF to transmit the first data packet to the first DNS server, the first data packet traverses through a first N6 interface and public network to reach the first DNS server.

12. The method of claim 8, wherein, in response to causing the first UPF to transmit the second data packet to the second DNS server, the second data packet traverses through a first N6 interface and public network to reach the second DNS server.

13. The method of claim 8, wherein the internal network routing issue comprises at least one of an internal network congestion or an insufficient allocated network bandwidth.

14. The method of claim 8, wherein the first UPF is deployed on a first network node that is communicatively coupled with a jump server.

15. An apparatus for detecting and addressing latency in network routing, comprising:
a jump server communicatively coupled to a plurality of DNS servers comprising a first DNS server and a second DNS server, the jump server comprising:
a memory configured to store a threshold latency value; and
a processor operably coupled to the memory, and configured to:
receive an input file comprising a first internet protocol (IP) address associated with the first DNS server, a second IP address associated with the second DNS server, and an identifier associated with a first user plane function (UPF);
cause the first UPF to transmit a first data packet to the first DNS server;
cause the first UPF to transmit a second data packet to the second DNS server;
determine a first latency value associated with the first data packet routing to the first DNS server;
determine a second latency value associated with the second data packet routing to the second DNS server;
compare the first latency value with the threshold latency value;
compare the second latency value with the threshold latency value;
determine whether each of the first latency value and the second latency value is more than the threshold latency value;
in response to determining that each of the first latency value and the second latency value is more than the threshold latency value:
determine that the first latency value and the second latency value are caused by an internal network routing issue with respect to the first UPF; and
addresses the internal network routing issue with respect to the first UPF;
in response to determining that the first latency value is more than the threshold latency value and that the second latency value is less than the threshold latency value:
determine that the first latency value is caused by the first DNS server; and
address the first latency value caused by the first DNS server.

16. The apparatus of claim 15, wherein:
the first latency value comprises a first round-trip time (RTT) delay associated with the first data packet being transmitted from the first UPF to the first DNS server and an acknowledgment message from the first DNS server to the first UPF; and
the second latency value comprises a second RTT delay associated with the second data packet being transmitted from the first UPF to the second DNS server and an acknowledgment message from the second DNS server to the first UPF.

17. The apparatus of claim 15, wherein, in response to causing the first UPF to transmit the first data packet to the first DNS server, the first data packet traverses through a first N6 interface and public network to reach the first DNS server.

18. The apparatus of claim 15, wherein, in response to causing the first UPF to transmit the second data packet to the second DNS server, the second data packet traverses through a first N6 interface and public network to reach the second DNS server.

19. The apparatus of claim 15, wherein the internal network routing issue comprises at least one of an internal network congestion or an insufficient allocated network bandwidth.

20. The apparatus of claim 15, wherein the first UPF is deployed on a first network node that is communicatively coupled with the jump server.

* * * * *